(No Model.)
W. L. DEWOLF.
WASH BASIN AND TRAP.
No. 331,947. Patented Dec. 8, 1885.
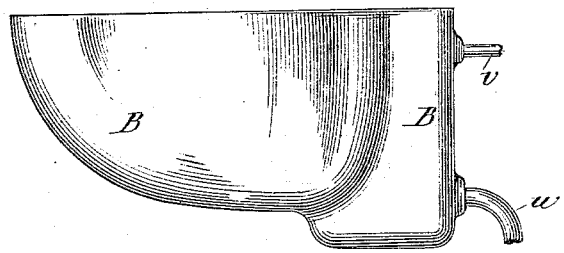
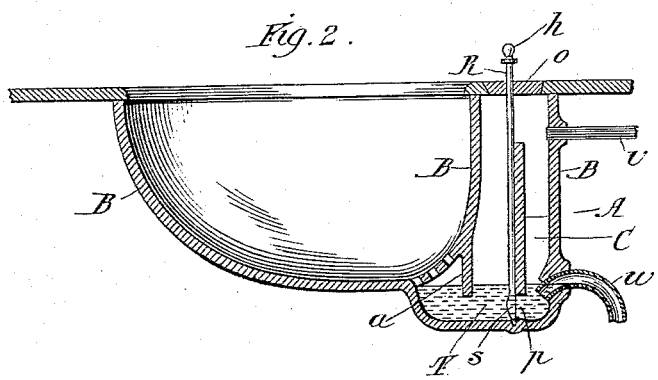
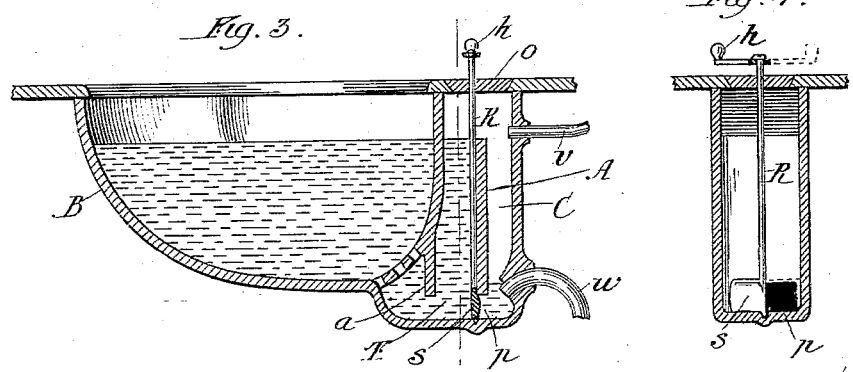
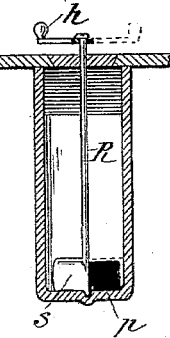
Witnesses:
Frank J. Blanchard
Calvin DeWolf
Inventor:
Wallace L. DeWolf

UNITED STATES PATENT OFFICE.

WALLACE L. DEWOLF, OF CHICAGO, ILLINOIS.

WASH-BASIN AND TRAP.

SPECIFICATION forming part of Letters Patent No. 331,947, dated December 8, 1885.

Application filed September 19, 1885. Serial No. 177,548. (No model.)

*To all whom it may concern:*

Be it known that I, WALLACE L. DEWOLF, a citizen of the United States, residing at Chicago, in the county of Cook and State of Illinois, have invented a new and useful Combined Wash-Basin and Trap, of which the following is a specification.

My invention relates to wash-basins, bathtubs, and other receptacles in which an overflow is required.

The objects of my invention are, first, to provide a basin so constructed that the overflow chamber or pipe is ventilated and trapped; and, second, to utilize the trap made in the basin as a combined trap for the waste-pipe and overflow-chamber to prevent any gas from escaping into the room. I attain these objects by means of a basin and trap constructed as shown in the accompanying drawings, in which—

Figure 1 represents an exterior view of the basin; Fig. 2, a sectional view of the basin, showing the trap, overflow-chamber, rod, and waste-pipe; Fig. 3, a sectional view of the same, showing the stopple and basin full of water; Fig. 4, a view of the partition in the overflow-chamber, showing the rod, stopper, and outlet.

Similar letters refer to similar parts throughout the several views.

B represents the basin; T, the trap which traps the waste-pipe from the overflow-chamber and also the overflow-chamber from the bowl, as shown in Fig. 2.

C represents the overflow-chamber; a, the arm to the basin, reaching into the water held in trap; A, the partition in the overflow-chamber C; h, the handle to rod R; R, the rod for operating the stopple S; S, the stopple for closing the outlet in partition a; p, the outlet; o, the cover over chamber C; v, the vent-pipe; w, the waste-pipe.

By means of the handle h, connecting with the rod R and stopple S, the outlet p may be opened or closed. When the outlet is open, as shown in Figs. 2 and 4, the basin will drain, but the trap T will remain full of water, thus serving as a trap for the gases from the waste-pipe into the chamber C, and also for any gases or odors from the chamber C into the bowl. When the outlet p is closed by stopple S, the basin will fill to a point level with the top of partition A, and the surplus water will flow over the top of partition A and down the waste-pipe.

I am not aware that any basin has heretofore been constructed in which the overflow-pipe has been trapped above the water-line of the outlet to the waste-pipe, or in which the overflow-chamber has been trapped above the water-line of the outlet to the waste-pipe by a trap which is a part of the basin, so as to cut off the odor and stench from the overflow-chamber, its connections, and also the waste-pipe.

By means of my invention the overflow-chamber above the water-line of the waste-pipe outlet and all parts of my basin not exposed to view and liable to become foul are trapped, and all danger from gases or stench escaping into the room completely avoided.

What I claim, and desire to secure by Letters Patent of the United States, is—

In a wash basin or tub, the basin B, overflow-chamber C, arm a, partition A, rod R, handle h, stopple S, and waste-pipe w, and vent v, in combination with trap T, all arranged and constructed substantially as described, and for the purpose specified.

WALLACE L. DEWOLF.

Witnesses:
 CALVIN DEWOLF,
 HENRY B. CHAMBERLIN.